(12) United States Patent
Tabuchi et al.

(10) Patent No.: US 9,520,823 B2
(45) Date of Patent: Dec. 13, 2016

(54) CONTROL CIRCUIT AND METHOD (71) Applicant: Semiconductor Components Industries, LLC, Phoenix, AZ (US)

(72) Inventors: Yoshihisa Tabuchi, Gifu (JP); Tomonori Kamiya, Ichinomiya (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 176 days.

(21) Appl. No.: 14/520,452

(22) Filed: Oct. 22, 2014

(65) Prior Publication Data

US 2016/0118921 A1 Apr. 28, 2016

(51) Int. Cl.
H02P 25/034 (2016.01)

(52) U.S. Cl.
CPC .................................. H02P 25/034 (2016.02)

(58) Field of Classification Search
USPC ........................................ 318/494, 629, 721
See application file for complete search history.

(56) References Cited

U.S. PATENT DOCUMENTS

| | | | | |
|---|---|---|---|---|
| 6,381,292 B1* | 4/2002 | Yamakoshi | ........ | G11B 5/59633 375/376 |
| 8,212,505 B2* | 7/2012 | Nagashima | ............. | B60L 11/14 180/54.1 |
| 2001/0036036 A1* | 11/2001 | Bonin | .................. | G11B 5/5556 360/78.06 |
| 2001/0043416 A1* | 11/2001 | Kato | ................... | G11B 20/1403 360/40 |
| 2002/0024397 A1* | 2/2002 | Fujii | ........................ | H03B 5/36 331/116 R |
| 2002/0165889 A1* | 11/2002 | Huang | .................... | G06F 1/022 708/276 |
| 2005/0078405 A1* | 4/2005 | Baek | .................... | G11B 5/59611 360/78.04 |
| 2006/0119573 A1* | 6/2006 | Grant | .................... | B06B 1/0215 345/156 |
| 2007/0070540 A1* | 3/2007 | Noguchi | ................ | G11B 5/596 360/75 |
| 2008/0265178 A1* | 10/2008 | Johnston | ................ | G02B 26/10 250/492.1 |
| 2010/0201300 A1 | 8/2010 | Lyden et al. | | |
| 2010/0201301 A1 | 8/2010 | Lyden et al. | | |
| 2010/0201302 A1* | 8/2010 | Lyden | ...................... | G05B 5/01 318/629 |
| 2011/0085260 A1* | 4/2011 | Wada | ................... | G11B 19/042 360/75 |

(Continued)

*Primary Examiner* — Paul Ip
*Assistant Examiner* — Devon Joseph
(74) *Attorney, Agent, or Firm* — Rennie William Dover (57) ABSTRACT

In accordance with an embodiment, an actuator control circuit includes a driver circuit connected to a ringing characteristic determination circuit. A signal generator that is configured to generate an output signal having first period that has first and second portions where the first portion longer than the second portion is connected to the ringing characteristic determination circuit. Another embodiment includes a method for controlling an actuator by determining a resonant frequency and a ringing amplitude of an actuator signal; generating a control signal in response to the resonant frequency and the ringing amplitude of the actuator signal; and causing the actuator to move in response to the second drive signal.

20 Claims, 7 Drawing Sheets

(56) References Cited

U.S. PATENT DOCUMENTS

2014/0021886 A1\* 1/2014 Kurosawa ............. H02P 25/028
              318/135
2016/0099720 A1\* 4/2016 Bashir ................. H03B 5/1215
              331/8

\* cited by examiner

CONTROL CIRCUIT AND METHOD

BACKGROUND

The present invention relates, in general, to electronics and, more particularly, to control circuits and methods.

In the past, motor driven translation systems have been used to control movement of mechanical systems using electrical signals. These types of systems have been used for controlling movement in a variety of systems including digital cameras, video recorders, and portable electronic devices. U.S. Patent Application Publication No. 2010/0201300 A1 published on Aug. 12, 2010 and filed by Colin Lyden et al. teaches a technique for generating a drive signal for a voice coil motor actuator that includes applying a test driving signal, receiving a back channel electric signal, and calculating the resonant frequency of the voice coil actuator from the back channel electric signal. The system uses the resonant frequency to create a drive signal for the voice coil actuator. Because this technique only uses the resonant frequency to generate the drive signal, it does not take into account different amplitude variations, which increases the settling time of the voice coil actuator. U.S. Patent Application Publication No. 2010/0201301 A1 published on Aug. 12, 2010 and filed by Colin Lyden et al. teaches a technique that addresses the increased settling time by using a pair of step signals that are sufficient to activate movement of a mechanical system and then place the mechanical system at a desired position. U.S. Patent Application Publication No. 2010/0201302 A1 published on Aug. 12, 2010 and filed by Colin Lyden et al. teaches a technique that uses a series of steps according to a selected row of Pascal's triangle. A drawback with these approaches is that the drive signals generated by these techniques have poor settling characteristics, e.g., the settling time is long.

Accordingly, it would be advantageous to have a circuit and a method for generating a drive signal having a fast settling time. It is desirable for the circuit and method to be cost and time efficient to implement.

BRIEF DESCRIPTION OF THE DRAWINGS

The present invention will be better understood from a reading of the following detailed description, taken in conjunction with the accompanying drawing figures, in which like reference characters designate like elements and in which.

For simplicity and clarity of illustration, elements in the figures are not necessarily to scale, and the same reference characters in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or an anode of a diode, and a control electrode means an element of the device that controls current flow through the device such as a gate of an MOS transistor or a base of a bipolar transistor. Although the devices are explained herein as certain n-channel or p-channel devices, or certain n-type or p-type doped regions, a person of ordinary skill in the art will appreciate that complementary devices are also possible in accordance with embodiments of the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action and the initial action. The use of the words approximately, about, or substantially means that a value of an element has a parameter that is expected to be very close to a stated value or position. However, as is well known in the art there are always minor variances that prevent the values or positions from being exactly as stated. It is well established in the art that variances of up to about ten percent (10%) (and up to twenty percent (20%) for semiconductor doping concentrations) are regarded as reasonable variances from the ideal goal of being exactly as described.

It should be noted that a logic zero voltage level ($V_L$) is also referred to as a logic low voltage or logic low voltage level and that the voltage level of a logic zero voltage is a function of the power supply voltage and the type of logic family. For example, in a Complementary Metal Oxide Semiconductor (CMOS) logic family a logic zero voltage may be thirty percent of the power supply voltage level. In a five volt Transistor-Transistor Logic (TTL) system a logic zero voltage level may be about 0.8 volts, whereas for a five volt CMOS system, the logic zero voltage level may be about 1.5 volts. A logic one voltage level ($V_H$) is also referred to as a logic high voltage level, a logic high voltage, or a logic one voltage and, like the logic zero voltage level, the logic high voltage level also may be a function of the power supply and the type of logic family. For example, in a CMOS system a logic one voltage may be about seventy percent of the power supply voltage level. In a five volt TTL system a logic one voltage may be about 2.4 volts, whereas for a five volt CMOS system, the logic one voltage may be about 3.5 volts.

DETAILED DESCRIPTION

Generally, the present invention provides a method for controlling an actuator that comprises causing an actuator to move in response to a first drive signal and determining a resonant frequency and a ringing amplitude from a movement of the actuator. A second drive signal is determined from the resonant frequency and the ringing amplitude of the movement of the actuator which second drive signal is used to cause the actuator to move.

In accordance with an embodiment, determining the resonant frequency and the ringing amplitude of an actuator signal includes determining the resonant frequency and the ringing amplitude of a voice coil motor actuator.

In accordance with another embodiment, causing the actuator to move in response to the first drive signal includes causing the actuator to move in response to a first current signal.

In accordance with another embodiment, causing the actuator to move in response to the first drive signal includes causing the actuator to have an oscillatory movement having a waveform shape that has a plurality of amplitude values, and wherein a first amplitude value of the oscillatory movement is different from a second amplitude value of the oscillatory movement, which second amplitude is different from a third amplitude value, and wherein the oscillatory movement has a period.

In accordance with another embodiment, the first amplitude value, the second amplitude value, and the third amplitude value are used to determine an amplitude ratio of the oscillatory movement.

In accordance with another embodiment, using the first amplitude value, the second amplitude value, and the third amplitude value to determine the amplitude ratio includes dividing a difference between the second amplitude value and the first amplitude value by a sum of the difference between the second amplitude value and the first amplitude value and a difference between the third amplitude value and the second amplitude value.

In accordance with another embodiment, the amplitude ratio and the period of the oscillatory movement are used to generate the second drive signal.

In accordance with another embodiment, a time interval between the first time and the second time can be represented by a product of the period of the oscillatory movement and a quantity that can be represented by a sum of the amplitude ratio divided by three and the difference between the amplitude ratio and 0.55 divided by 2 and a time interval between the second time and the third time that can be represented by a product of the period of the oscillatory movement and a quantity that can be represented by a sum of 1 divided by 3 and the difference between the amplitude ratio and 0.55 divided by 2.

In accordance with another embodiment, a portion of the second drive signal from the first time to the second time causes the actuator to oscillate about a first position that is different from a second position and wherein a portion of the second drive signal from third time causes the actuator to oscillate about the second position.

In accordance with another embodiment, the second drive signal is a current drive signal that increases from a first level to a second level at a first time and decreases to the first level at a second time, and wherein the current signal increases to the second level at a third time.

In accordance with another embodiment, causing the actuator to move in response to the first drive signal includes causing the actuator to move in response to a first current signal having a step shape that changes from a first current level to a second current level at a first time.

In accordance with another embodiment, causing the actuator to move in response to the first drive signal includes causing the actuator to move in response to a first current signal having a step shape that changes from a first current level to a second current level at a first time and from the second level to a third level at a second time, the second level greater than the first level.

In accordance with another embodiment, a method for controlling a voice coil motor actuator, comprises determining a resonant frequency and a ringing amplitude of an actuator movement in response to a first drive signal and generating a second drive signal in response to the resonant frequency and the ringing amplitude of the actuator movement. The moving the voice coil motor actuator moves in response to the second drive.

In accordance with another embodiment, moving the voice coil motor actuator in response to the second drive signal includes moving one of a uni-directional actuator or a bi-directional actuator.

In accordance with another embodiment, moving the voice coil motor actuator in response to the second drive signal includes moving the voice coil motor actuator such that it has a period that ranges between 0.3 and 0.4 of a period of the actuator movement.

In accordance with another embodiment, an actuator control circuit, comprises a driver circuit having a plurality of terminals, a ringing characteristic determination circuit having an input and an output, the input coupled to a first terminal of the plurality of terminals of the driver circuit and configured to provide a resonant frequency and a ringing amplitude from a movement of the actuator; and a signal generator having an input and an output, the input coupled to the output of the ringing characteristic determination circuit and the output coupled to a second terminal of the plurality of terminals of the driver circuit, wherein the second terminal is an input terminal, and wherein the signal generator is configured to generate a drive signal.

In accordance with another embodiment, the ringing characteristic determination circuit comprises an amplifier having an input and an output, a converter circuit having an input and an output, the input of the converter circuit coupled to the output of the amplifier, and a measurement circuit configured to measure the resonant frequency and the ringing amplitude from the movement of the actuator.

In accordance with another embodiment, the signal generator comprises: a waveform generator having first and second inputs and an output; a first summer having a first summing input, a second summing input, and a summing output, the summing output coupled to the second input of the waveform generator; a signal processor having first and second inputs and an output, the first input of the signal processor coupled to the output of the waveform generator; a second summer having a first summing input, a second summing input, and a summing output, the first summing input of the second summer coupled to the output of the signal processor; a first position indicator having an input, a first output, and a second output, the input of the first position indicator coupled to the output of the signal processor; a second position indicator having an input and an output, the input coupled to the first output of the first position indicator and the output of the second position indicator coupled to the second input of the second summer; and a drive circuit having an input and an output, the input of the drive circuit coupled to the output of the first position detector, the drive circuit configured to generate a digital code signal.

In accordance with another embodiment, the ringing characteristic determination circuit comprises an operational amplifier having an inverting input, a non-inverting input, and an output; a first resistor coupled between the non-inverting input and the output of the operational amplifier; a series connected pair of resistors coupled between the output of the driver circuit and the inverting input of the operational amplifier; a first variable resistor having first and second terminals, the first terminal coupled to the non-inverting input of the operational amplifier; and a digital-to-analog-converter coupled to the second terminal of the first variable.

In accordance with another embodiment, the driver circuit comprises: a digital-to-analog converter having an input and an output, wherein the input of the digital-to-analog converter serves as the second terminal of the driver circuit; an amplifier having an inverting input, a noninverting input, and an output, the noninverting input coupled to the output of the digital-to-analog converter and the inverting input coupled to a sense resistor; a transistor circuit having a control terminal, a first current carrying terminal, and a second current carrying terminal, the control terminal coupled to the output of the amplifier and the first current carrying terminal of the transistor coupled to the input of the ringing characteristic determination circuit.

Figure 1:
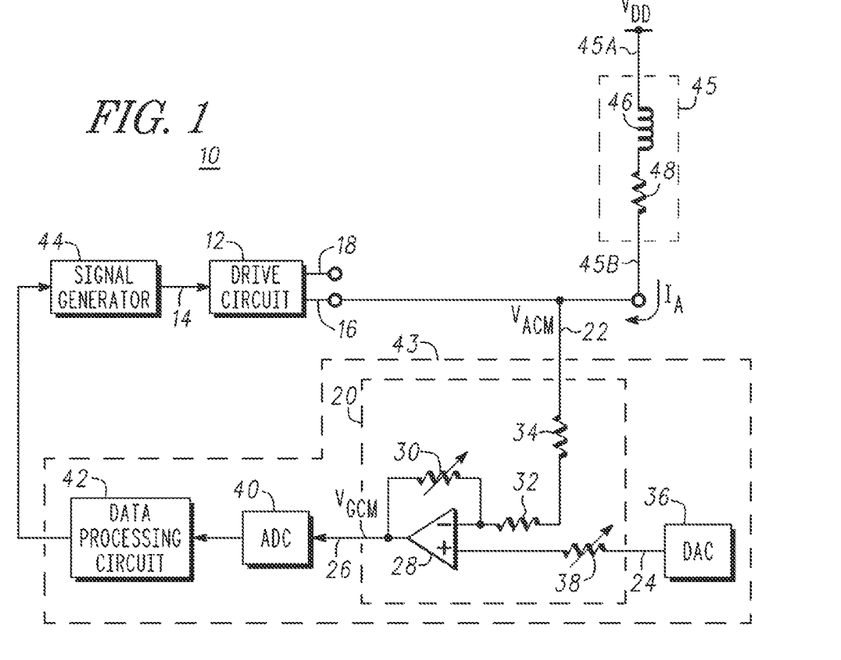
FIG. 1 is a block diagram of a control circuit suitable for controlling a mechanical system in accordance with an embodiment of the present invention.

FIG. 1 is a circuit schematic of a control circuit 10 suitable for controlling an actuator such as, for example, a voice coil motor in accordance with an embodiment of the present invention. What is shown in FIG. 1 is a drive circuit 12 having an input 14 and input/output terminals 16 and 18. Input/output terminal 16 is connected to an amplifier circuit 20 having inputs 22 and 24, and an output 26. By way of example, amplifier circuit 20 is a Variable Gain Amplifier ("VGA") that includes an operational amplifier 28 in a negative feedback configuration and having a non-inverting input, an inverting input, and an output. The inverting input is connected to the output of operational amplifier 28 through a variable resistance resistor 30, such as, for example, a potentiometer, and to input 22 through series connected resistors 32 and 34. The non-inverting input of operational amplifier 28 is connected to a Digital-to-Analog converter ("DAC") 36 through a variable resistance resistor 38, such as, for example, a potentiometer. Although resistors 30 and 38 are described as being variable resistance resistors, one or both of resistors 30 and 38 may be resistors having fixed resistance values.

Output 26 of amplifier circuit 20 is connected to the input of an Analog-to-Digital Converter ("ADC") 40, which ADC 40 has an output connected to the input of a data processing circuit 42. Data processing circuit 42 is connected to drive circuit 12 through a signal generator 44. More particularly, signal generator 44 has an input connected to an output of data processing circuit 42 and an output connected to input 14 of drive circuit 12. Amplifier circuit 20, ADC 40, and data processing circuit 42 form a ringing characteristic measurement circuit 43.

Input/output terminal 16 is connected to a terminal 45B of a Voice Coil Motor ("VCM") actuator 45. By way of example, VCM actuator 45 may be represented as an inductor 46 connected in series with a resistor 48. VCM actuator 45 has another terminal 45A coupled for receiving a source of potential $V_{DD}$. By way of example, potential $V_{DD}$ ranges from about 1 volt to about 7 volts. In accordance with another example, potential $V_{DD}$ ranges from about 2.2 volts to about 4.8 volts.

Figure 2:
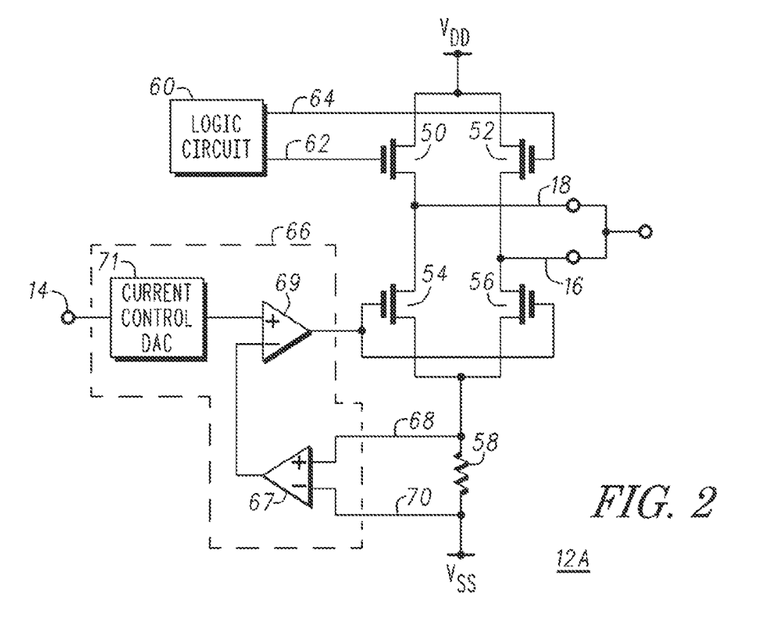
FIG. 2 is a circuit schematic of a portion of the control circuit of FIG. 1 in accordance with another embodiment of the present invention.

Referring now to FIG. 2, a circuit schematic of a drive circuit 12A is illustrated. It should be noted that reference character "A" has been appended to reference character 12 for the sake of generality. Drive circuit 12A includes transistors 50, 52, 54, and 56, wherein each transistor has a control electrode and a pair of current carrying electrodes. In accordance with embodiments in which transistors 50, 52, 54, and 56 are field effect transistors the control electrodes are gate electrodes and the current carrying electrodes are drain and source electrodes. The gate electrode, source electrode, and drain electrode may be referred to as the gate, the source, and the drain, respectively, or a gate terminal, a source terminal, and a drain terminal, respectively. Thus, the drain terminals of transistors 50 and 52 are connected together and coupled for receiving a source of operating potential such as, for example, $V_{DD}$. The source terminal of transistor 50 is connected to the drain terminal of transistor 54 to form input/output terminal 18 and the source terminal of transistor 52 is connected to the drain terminal of transistor 56 to form input/output terminal 16. The source terminals of transistor 54 and transistor 56 are connected together and to a terminal of a current sense resistor 58. The other terminal of current sense resistor 58 is coupled for receiving a source of operating potential such as, for example, $V_{SS}$. By way of example operating potential $V_{SS}$ is a ground potential. The gate terminal of transistor 50 is connected to an output 62 of a logic circuit 60 and the gate terminal of transistor 52 is connected to an output 64 of logic circuit 60. The gate terminal of transistor 54 is connected to the gate terminal of transistor 56 and to an output terminal of a controller 66 that includes an amplifier 67, an amplifier 69, and a Current Control Digital-to-Analog Converter ("DAC") 71.

Controller 66 has a pair of sense terminals 68 and 70 that are coupled across current sense resistor 58. In accordance with the embodiment of drive circuit 12A, terminals 16 and 18 are commonly connected together. It should be noted that drive circuit 12 in FIG. 1 shows input/output terminal 16 connected to actuator 45 and input/output terminal 18 floating, in FIG. 5, input/output terminals 16 and 18 are connected to each other to form a commonly connected terminal that is connected to input 22 of amplifier circuit 20 and to terminal 45B of VCM actuator 45. Controller 66 includes operational amplifier 67 and operational amplifier 69, wherein each operational amplifier 67 and 69 has an inverting input, a noninverting input, and an output. The noninverting input of operational amplifier 67 serves as input terminal 68 of controller 66 and the inverting input of operational amplifier 67 serves as input terminal 70 of controller 66. The output of operational amplifier 67 is connected to an inverting input of amplifier 69. Controller 66 further includes DAC 71 which has an input that serves as input terminal 14 of drive circuit 12 and an output connected to the noninverting input of operational amplifier 69.

Figure 3:
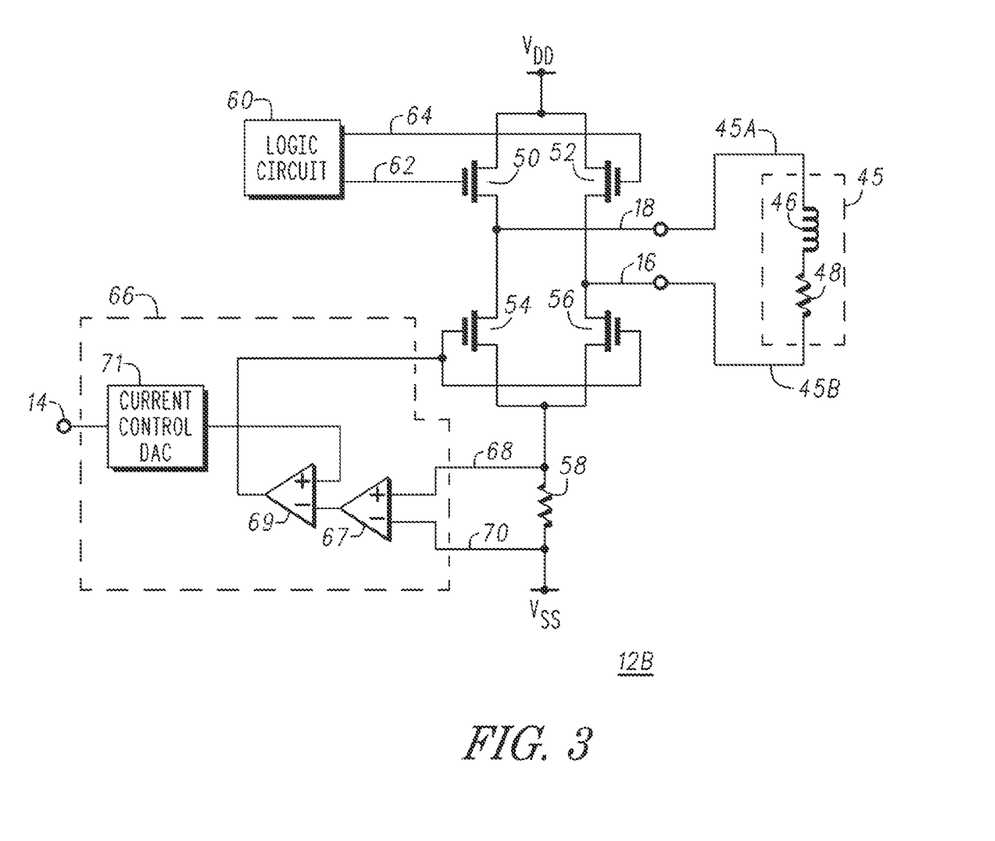
FIG. 3 is a circuit schematic of a portion of the control circuit of FIG. 1 in accordance with another embodiment of the present invention.

Referring now to FIG. 3, a circuit schematic of a drive circuit 12B is illustrated. It should be noted that reference character "B" has been appended to reference character 12 for the sake of generality. Drive circuit 12B may have the same configuration as drive circuit 12A except that input/output terminals 16 and 18 are not shorted together. In this configuration, terminal 45A of VCM actuator 45 is connected to input/output terminal 16 and terminal 45B of VCM actuator 45 is connected to input/output terminal 18.

Figure 4:
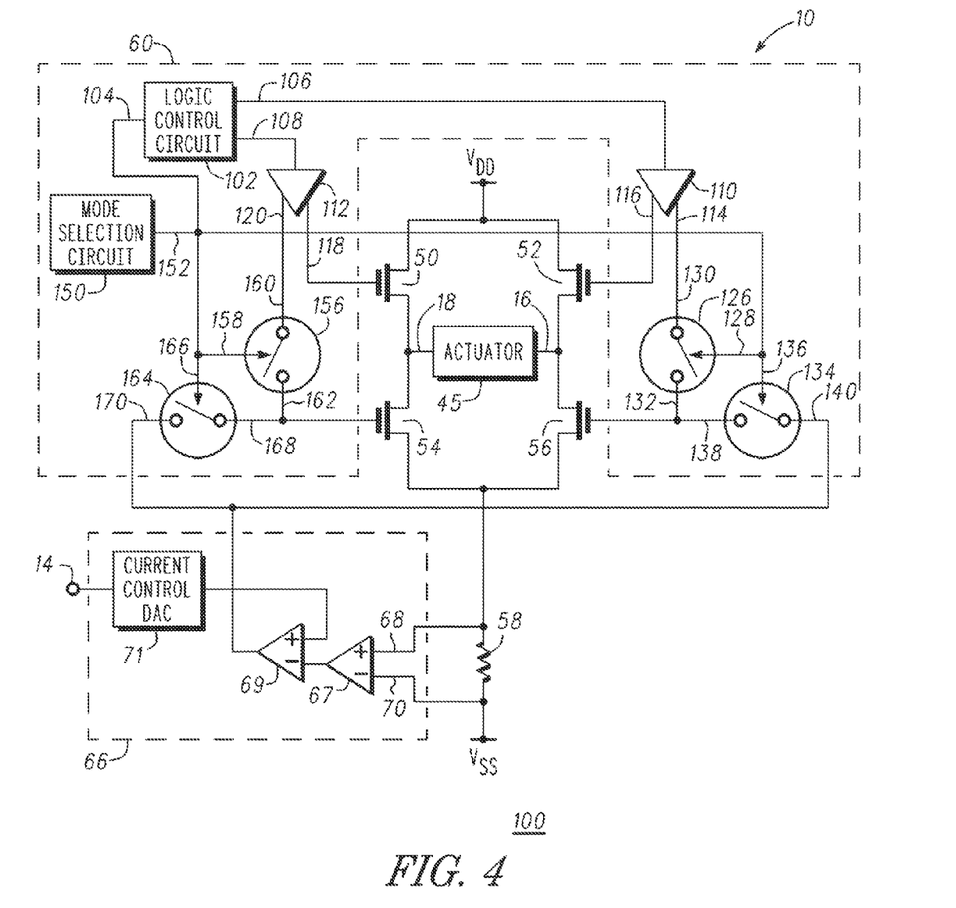
FIG. 4 is a circuit schematic of a portion of the control circuit of FIG. 1 in accordance with another embodiment of the present invention.

Referring now to FIG. 4, a circuit schematic 100 of control circuit 10 in accordance with another embodiment of the present invention is shown. Control circuit 10 includes transistors 50, 52, 54, and 56, and current sense resistor 58 as described with reference to FIGS. 1 and 2. A VCM actuator 45 is coupled between input/output terminals 16 and 18. Circuit schematic 100 includes an embodiment of logic circuit 60 and an embodiment of controller 66. More particularly, logic circuit 60 includes a logic control circuit 102 having an input 104 and outputs 106 and 108, wherein outputs 106 and 108 are connected to the inputs of buffers 110 and 112, respectively. Buffers 110 and 112 may be referred to as drivers or driver circuits, wherein buffer 110 has a pair of outputs 114 and 116 and buffer 112 has a pair of outputs 118 and 120. Output 114 is connected to a switch 126 having a control terminal 128 and conduction terminals 130 and 132, where conduction terminal 130 is connected to output 114 and to conduction terminal 132 is commonly connected to the gate terminal of field effect transistor 56 and a conduction terminal 138 of a switch 134, which switch 134 also has a control terminal 136 and another conduction terminal 140. Output 116 of buffer 110 is connected to the gate terminal of field effect transistor 52.

Logic circuit 60 further includes a mode selection circuit 150 having an output 152 commonly connected to input 104 of logic control circuit 102, control terminals 128 and 136 of switches 126 and 134, respectively, and to control terminals 158 and 166 of switches 156 and 164, respectively. Switch 156 further includes conduction terminals 160 and 162, and switch 164 further includes conduction terminals 168 and 170. Conduction terminal 160 is connected to terminal 120 of buffer 112 and conduction terminal 162 is commonly connected to conduction terminal 168 of switch 166 and to the gate terminal of field effect transistor 54.

Controller 66 includes amplifiers 67 and 69 and DAC 71 that have been described with reference to FIG. 2. Amplifier 67 has a noninverting input that serves as terminal 68, an inverting input that serves as terminal 70, and an output connected to the inverting input of amplifier 69. A noninverting input of amplifier 69 is connected to an output of DAC 71 and an output of amplifier 69 is connected to the gate terminals of transistors 54 and 56 through switches 164 and 134, respectively.

Figure 5:
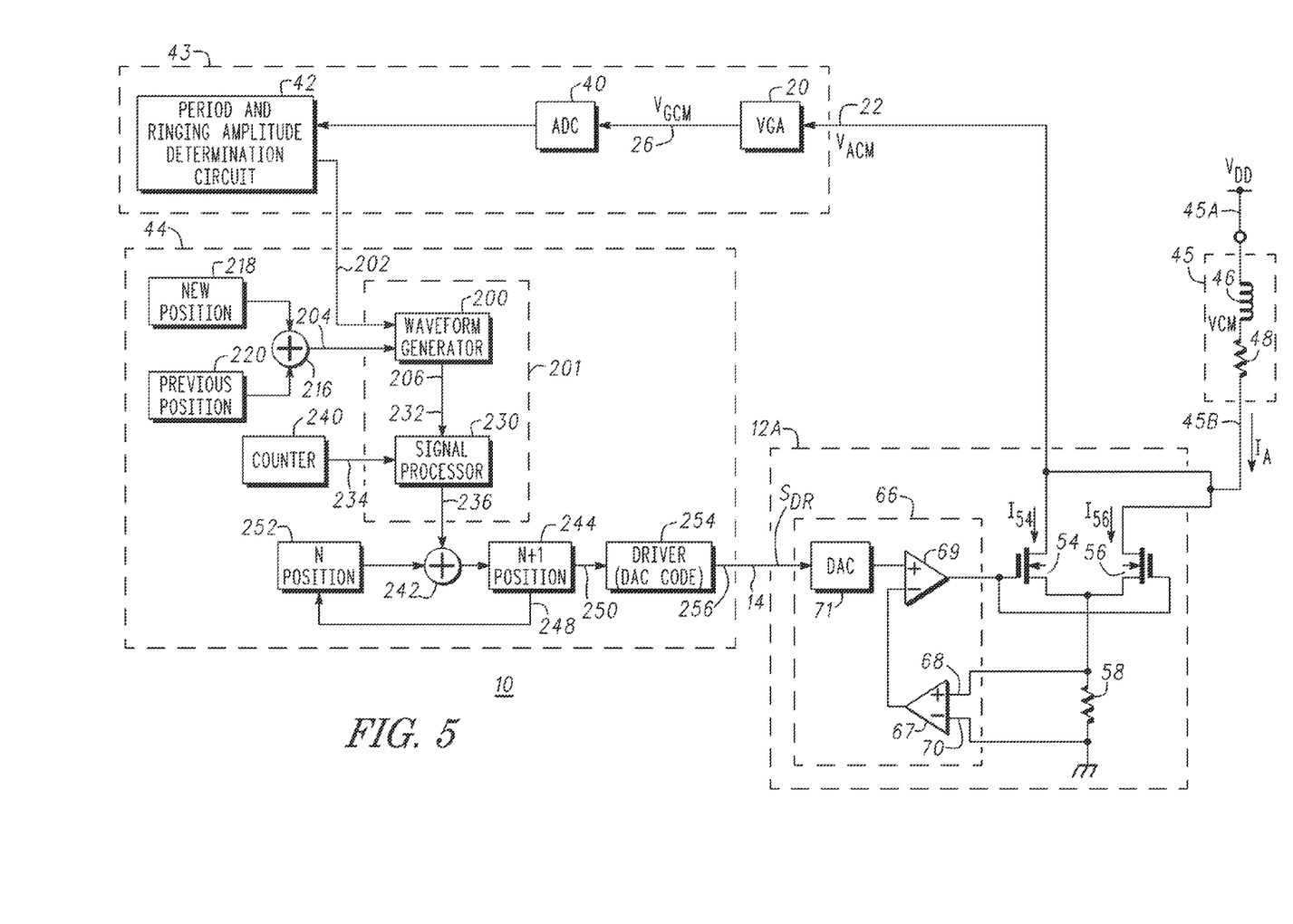
FIG. 5 is a block diagram of a portion of the control circuit suitable for controlling a mechanical system in accordance with another embodiment of the present invention.

FIG. 5 is control circuit 10 in accordance with another embodiment of the present invention. What is shown in FIG. 5 is a block diagram of control circuit 10 having drive circuit 12A connected to VCM actuator 45 and connected to signal generator 44 through ringing characteristic measurement circuit 43. Control circuit 12A includes controller 66, transistors 54, and 56, and resistor 58 as described with reference to FIG. 2. Input/output terminals 16 and 18 of drive circuit 12A are connected to terminal 22 of variable gain amplifier 20 and to terminal 45B of VCM actuator 45. Terminal 45A of VCM actuator 45 is coupled for receiving source of operating potential $V_{DD}$. By way of example, potential $V_{DD}$ ranges from about 1 volt to about 7 volts. In accordance with another example, potential $V_{DD}$ ranges from about 2.2 volts to about 4.8 volts.

Signal generator 44 has an input 202 coupled for receiving resonant period data and ringing amplitude data from ringing characteristic measurement circuit 43 and an output 256 coupled to input 14 of drive circuit 12A. Signal generator 44 includes a waveform generator 200 having inputs 202 and 204 and an output 206, wherein input 202 serves as the input of signal generator 44. Waveform generator 200 receives resonant period data and ringing amplitude data from ringing characteristic and measurement circuit 43 via input 202 and mechanical system element position data via input 204. Signal generator 44 includes a summer circuit 216 having an input connected to a position indicator 218, an input connected to a position indicator 220, and an output connected to input 204 of waveform generator 200. Position indicator 218 is configured to provide a new position of a mechanical system element and position indicator 220 is configured to provide the previous position of the mechanical system element. The mechanical system element may be a lens, a hard drive, a compact disc player, or the like. It should be noted that summer 216 may be configured to perform a subtraction operation such as, for example, subtracting the previous position from the new position or an addition operation.

Output 206 of waveform generator 200 is connected to an input 232 of a signal processor 230. In addition, signal processor 230 has an input 234 that receives a count signal or a count value from a counter 240 and an output terminal connected to a summer 242. Although waveform generator 200 and signal processor 230 are shown as separate units, this is not a limitation. Waveform generation and signal processing can be carried out by the same circuitry or unit. Thus waveform generator 200 and signal processor 230 are shown in a box made of dashed lines and identified by reference character 201. More particularly, summer 242 has an input connected to output 236 of signal processor 230, an input connected to an output of a current position indicator circuit 252, and an output connected to an input 246 of a position incrementer/decrementer circuit 244. Position incrementer/decrementer circuit 244 has an output 248 and an output 250, wherein output 248 is connected to an input of a current position indicator circuit 252. Like summer 216, summer 242 may be configured to perform a subtraction operation or an addition operation. Output 250 of incrementer/decrementer circuit 244 is connected to an input of a driver 254, which driver 254 may be connected to input 14 of drive circuit 12 (shown in FIG. 1) through an output 256. Control circuit 10 may be referred to as being in a unidirectional actuator configuration.

Figure 6:
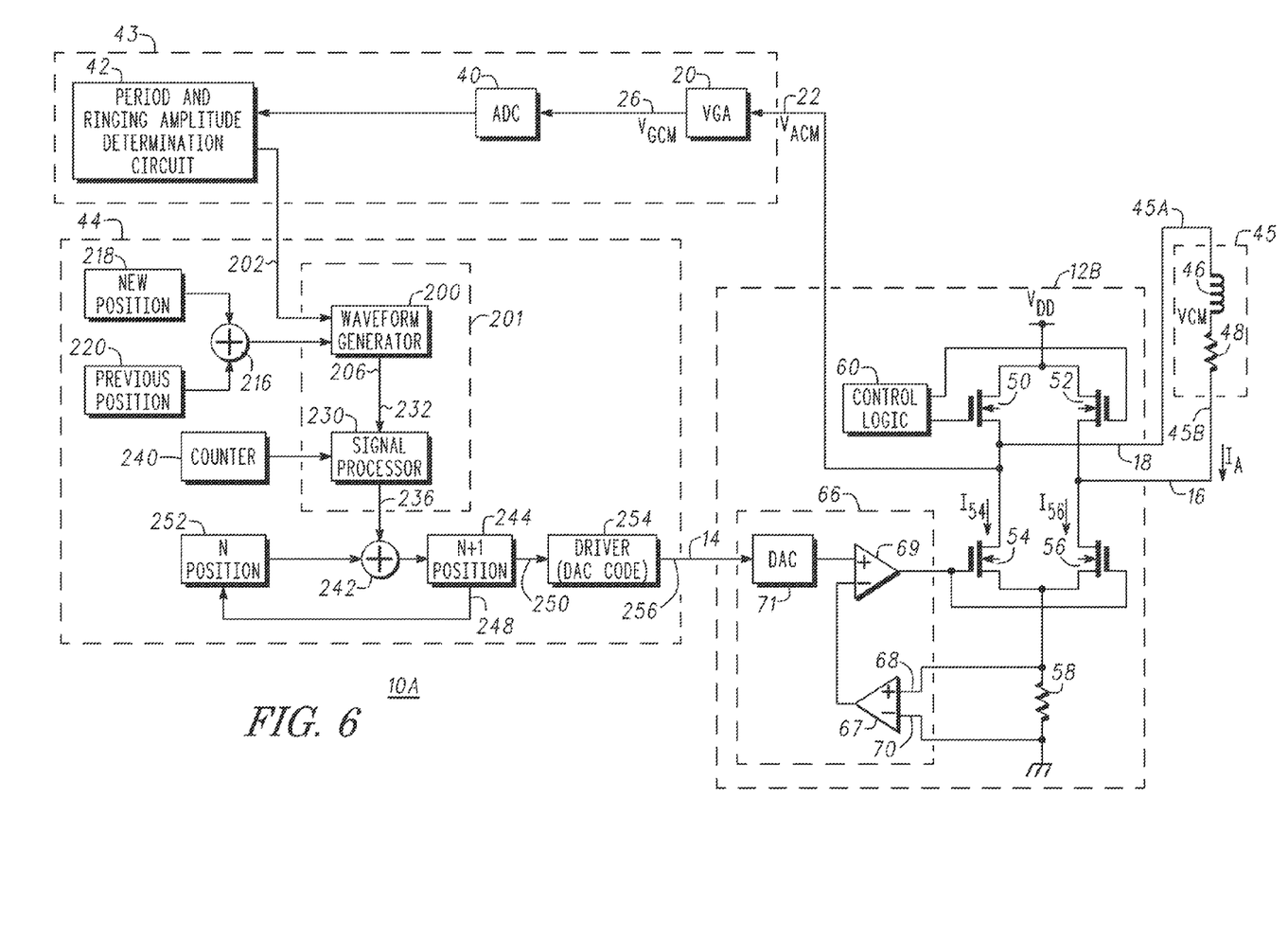
FIG. 6 is a block diagram of a portion of the control circuit suitable for controlling a mechanical system in accordance with another embodiment of the present invention.

Referring now to FIG. 6, control circuit 10A in accordance with another embodiment of the present invention is shown. Control circuit 10A is similar to control circuit 10, except that control circuit 10A includes transistors 50 and 52 described with reference to FIG. 2 and terminal 16 and terminal 18 of control circuit 10A are not directly connected together; rather, terminal 16 is connected to a terminal 45B of VCM actuator 45 and terminal 18 is connected to terminal 45A of VCM actuator 45. Control circuit 10A may be referred to as being in a bi-directional actuator configuration.

In operation and with reference to FIG. 1 and to FIG. 5, in response to a drive signal $S_{DR}$ at input 14 of drive circuit 12A, VCM actuator 45 oscillates such that its positional response may be described by a signal having a ringing amplitude and a resonant frequency. It should be noted that drive signal $S_{DR}$ is a digital signal or digital code that may represent a step waveform, a pulse waveform, a waveform that is generated while control circuit 10 is in operation, or the like. Control circuits 10 and 10A translate the positional information into current and voltage signals. More particularly, in response to movement by VCM actuator 45, a current signal $I_A$ is produced that is made up of portions $I_{54}$ and $I_{56}$. Portion $I_{22}$ flows through input 22 and into variable gain amplifier 20, whereas portions $I_{54}$ and $I_{56}$ flow into the drains of transistors 54 and 56, respectively. Thus, drive circuit 12A sinks portions $I_{54}$ and $I_{56}$ of current $I_A$. In response to voltage $V_{ACM}$ at terminal 22, variable gain amplifier 20 generates an amplified voice coil motor actuator voltage $V_{GCM}$ at output 26.

ADC 40 digitizes amplified voice coil motor actuator voltage $V_{GCM}$ and generates a digital amplified voice coil motor actuator voltage $S_{DG}$ at its output, which digital amplified voice coil motor actuator voltage $S_{DG}$ is input to data processing circuit 42. Data processing circuit 42 extracts ringing amplitude data and resonance data from amplified voice coil motor actuator voltage $S_{DG}$. In accordance with an embodiment, data processing circuit 42 generates an output signal $S_{TR}$ in response to voice coil motor actuator voltage $S_{DG}$. Thus, data processing circuit 42 may be referred to as a period and ringing amplitude determination circuit.

Data processing circuit 42 determines the ringing amplitude information and the resonant frequency information, i.e., the ringing characteristics, from digital amplified voice coil motor actuator voltage $S_{DG}$. For example, the resonant frequency may be determined as the time between consecutive inflection points of the same polarity. The ringing amplitude may be determined from the position amplitudes at adjacent or consecutive inflection points. Although the inflection points at times $t_1$, $t_2$, and $t_3$ have been shown such that a relative minima is between two relative maxima, this is not a limitation. Alternatively, the ringing characteristics may be determined from consecutive inflection points in which an inflection point having a relative maxima is between a pair of inflection points having a relative minima.

Figure 7:
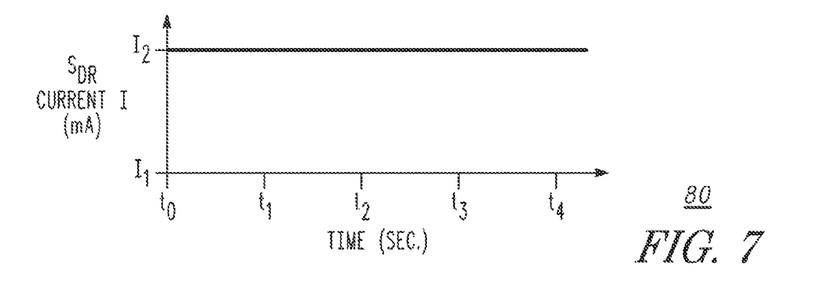
FIG. 7 is a drive signal in accordance with an embodiment of the present invention.
Figure 8:
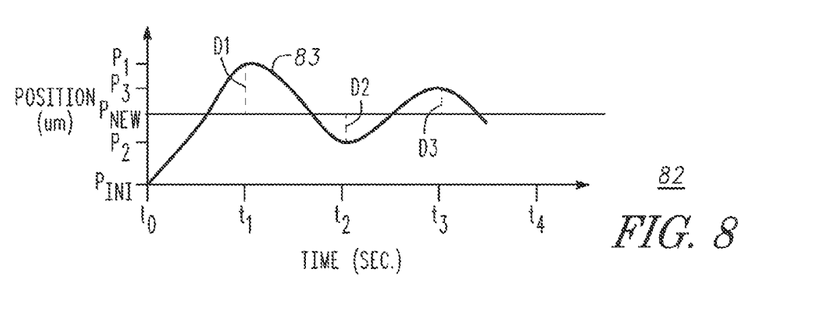
FIG. 8 is a signal generated in response to the drive signal of FIG. 7.
Figure 11:
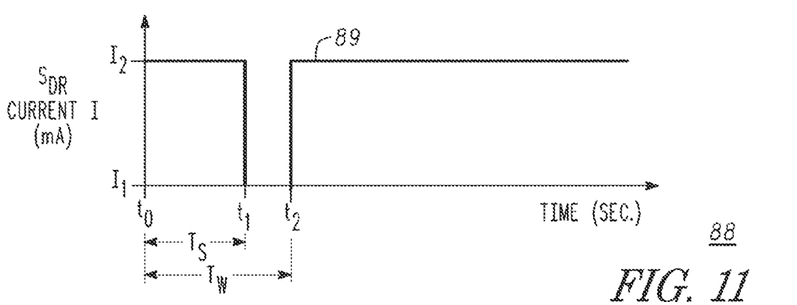
FIG. 11 is a pulse waveform generated in accordance with another embodiment of the present invention.

In accordance with an embodiment, FIG. 7 is a plot 80 of a drive signal $S_{DR}$ and FIG. 8 is a plot 82 of a response signal 83 suitable for deriving parameters that can be used to determine a drive signal such as for example drive signal 89 shown in FIG. 11. More particularly, drive signal $S_{DR}$, represented by trace 81 of plot 80, is a digital signal or a digital code that represents a current step that changes from current level $I_1$ to a current level $I_2$ causing VCM actuator 45 to move from an initial position $P_{INI}$ to a new position $P_{NEW}$ as depicted in FIG. 8 as trace 83 of plot 82. It should be noted that in examples in which the new position is the target position, the new position may be referred to as the target position $P_{TAR}$. In response to drive signal $S_{DR}$ being a step signal the actuator moves such that it oscillates about the new position $P_{NEW}$, wherein the position signal is a damped signal having a period T and a ringing envelope having amplitudes D1, D2, D3, etc. that are monotonically decreasing. Eventually actuator 45 settles at new position $P_{NEW}$. At time $t_1$, the ringing amplitude has an amplitude value of D1, at time $t_2$ the ringing amplitude has an amplitude value of D2, and at time $t_3$ the ringing amplitude has an amplitude value of D3, wherein amplitude D1 is greater than amplitude D2, amplitude D2 is greater than amplitude D3, etc. Amplitudes D1, D2, and D3 may be referred to as peak amplitudes, semi-amplitudes or as being half the peak-to-peak amplitude. In FIG. 8, amplitude D1 is the vertical distance from position $P_{NEW}$ to position $P_1$, amplitude D2 is the vertical distance from position $P_{NEW}$ to position $P_2$, amplitude D3 is the vertical distance from position $P_{NEW}$ to position $P_3$, etc.

Figure 9:
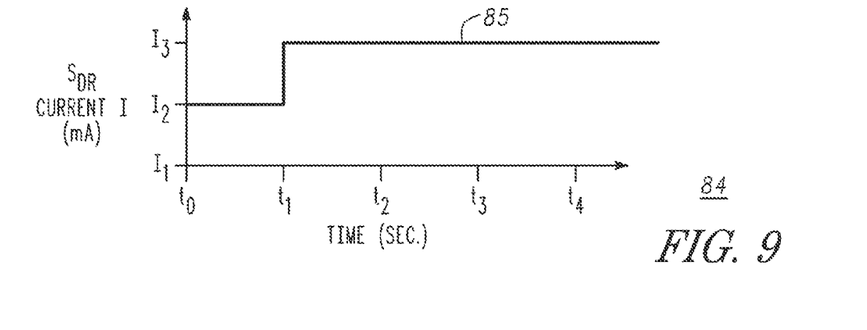
FIG. 9 is a drive signal in accordance with another embodiment of the present invention.
Figure 10:
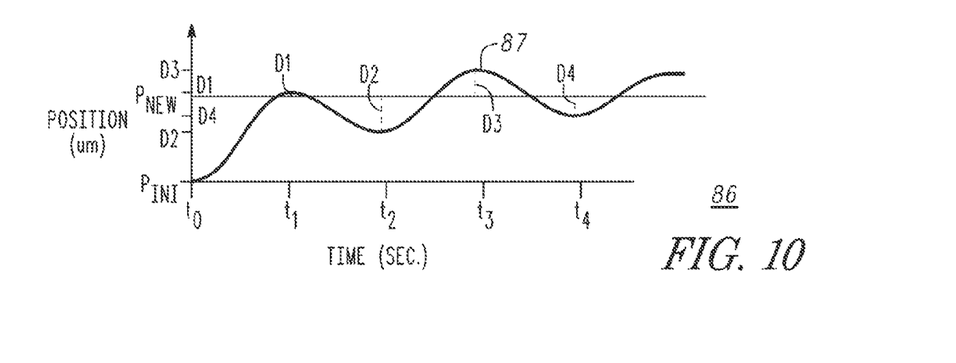
FIG. 10 is a signal generated in response to the drive signal of FIG. 9.

In accordance with another embodiment, FIG. 9 is a plot 84 of a drive signal $S_{DR}$ and FIG. 10 is a plot 86 of a response signal 87 suitable for deriving parameters that can be used to determine a drive signal such as for example drive signal 89 shown in FIG. 11. More particularly, drive signal $S_{DR}$, represented by trace 85 of plot 84, is a digital signal or a digital code that represents a current step that changes from current level $I_1$ to a current level $I_2$ at time $t_0$ and from current level $I_2$ to current level $I_3$ in a time $t_1$. In response to drive signal $S_{DR}$ being a multi-stepped waveform such as the waveform represented by trace 85, VCM actuator 45 moves such that it oscillates about the new position $P_{NEW}$, wherein the position signal is a damped signal having a period T and a ringing envelope having monotonically decreasing amplitudes D1, D2, D3, D4 etc. as shown in trace 87 of FIG. 10. Eventually VCM actuator 45 settles at new position $P_{NEW}$. In accordance with this example, at time $t_1$, the ringing amplitude has an amplitude value of D1, at time $t_2$ the ringing amplitude has an amplitude value of D2, at time $t_3$ the ringing amplitude has an amplitude value of D3, and at time $t_4$ the ringing amplitude has an amplitude value of D4. In this example, amplitude D1 is less that amplitude D2, which amplitude D2 is greater than amplitude D3, which amplitude D3 is less that amplitude D4. Amplitudes D2, D3, and D4 may be referred to as peak amplitudes, semi-amplitudes or as being half the peak-to-peak amplitude. In FIG. 10, amplitude D1 is the vertical distance from position $P_{NEW}$ to position $P_1$, amplitude D2 is the vertical distance from position $P_{NEW}$ to position $P_2$, amplitude D3 is the vertical distance from position $P_{NEW}$ to position $P_3$, amplitude D4 is the vertical distance from position $P_{NEW}$ to position $P_4$, etc. It should be noted that at time $t_1$, actuator 45 is still moving. Thus, the value of D1 may not be suitable for use in generating a drive signal.

In accordance with the embodiment of FIGS. 7 and 8, the period T of the fast settling time waveform response signal may be given as the time equal to the difference between times $t_3$ and $t_1$, i.e., time $t_3$ minus time $t_1$, and the ringing amplitude ratio may be given by Equation 1 (Eqt. 1).

$$RAR = (D2-D1)/((D2-D1)+(D3-D2)) \quad \text{Eqt. 1.}$$

In accordance with the embodiment of FIGS. 9 and 10, the period T of the fast settling time waveform response signal may be given as the time equal to the difference between times $t_4$ and $t_2$, i.e., time $t_4$ minus time $t_1$, and the ringing amplitude ratio may be given by Equation 2 (Eqt. 2).

$$RAR = (D3-D2)/((D3-D2)+(D4-D3)) \quad \text{Eqt. 2.}$$

Although the determination of the ringing amplitude ratio are shown as being determined using the positions of VCM actuator 45 at different times, the ringing amplitude ratio of Eqt. 1 or Eqt. 2 may be used to determine the characteristics of a suitable pulse signal described with reference to Eqt. 3 below. Although ringing amplitude ratio RAR may be determined from different parameters as described above, the ringing amplitude ratio is identified by the same abbreviation in Equations 2 and 3 because either ringing amplitude ratio may be used to determine a pulse width value $T_W$ and a pulse segment value $T_S$ using Equations 3 and 4 below.

Still referring to FIGS. 1 and 5, a previous position of actuator 45 is subtracted from the current position of actuator 45 to generate a VCM actuator position difference, and the result is transmitted to waveform generator 200 via input 204. In addition, the ringing characteristics, i.e., the resonant period ringing amplitude and the resonance period of signal $S_{TR}$ generated in response to voice coil actuator voltage $S_{DG}$, are transmitted from resonant period ringing amplitude determination circuit 42 to waveform generator 200, which waveform generator 200 generates a pulse signal 89 having a pulse width $T_W$ and a pulse segment $T_S$ shown in plot 88 of FIG. 11. Pulse width $T_W$ may be given by Equation 3 (Eqt. 3) and pulse segment $T_S$ may be given by Equation 4 (Eqt. 4) as:

$$T_W = T^*(\tfrac{1}{3} + ((((RAR)-0.55)/2)) \quad \text{Eqt. 3}$$

$$T_S = T^*((RAR)/3 + (((RAR)-0.55)/2)) \quad \text{Eqt. 4}$$

where the ringing amplitude ratio (RAR) is given by Eqt. 1 or Eqt. 2 and the period T is obtained from waveform 83 of FIG. 8 or waveform 87 of FIG. 10.

FIG. 11 is a plot 88 of drive signal $S_{DR}$ versus time wherein drive signal $S_{DR}$ is pulse waveform or pulse signal. As discussed above pulse signal 89 of FIG. 11 is transmitted to signal processor 230, which signal processor 230 uses count values from counter 240 and pulse signal 89 from waveform generator 200 to generate a ringing suppression signal 94 shown in FIG. 12.

Figure 12:
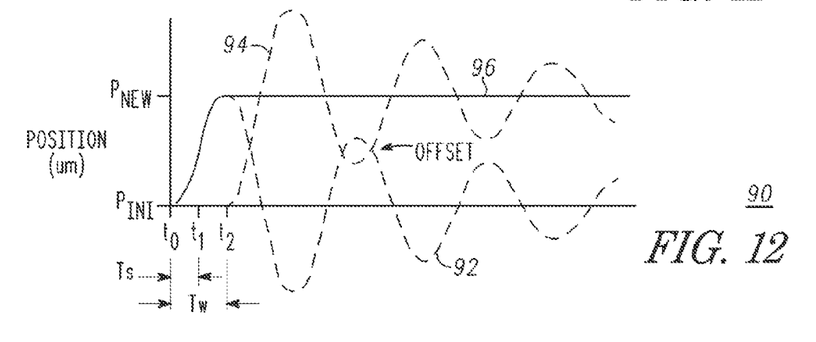
FIG. 12 is an embodiment of a ringing suppression waveform in accordance with another embodiment of the present invention.

Drive signal $S_{DR}$ is a pulse waveform that changes from current level $I_1$ to a current level $I_2$ at time $t_0$, from current level $I_2$ to current level $I_1$ at a time $t_1$, and from current level $I_1$ to current level $I_2$ at time $t_2$. FIG. 12 is a plot 90 illustrating the position of VCM actuator 45 versus time in response to drive signal $S_{DR}$. More particularly, in response to pulse waveform 89 actuator 45 moves from position $P_{INI}$ a time $t_0$ to position $P_{NEW}$ at time $t_2$ in response to pulse waveform 89, which movement is illustrated by trace 96, which may be referred to as a position indicator. Trace 96 results from the summation of response components 92 and 94, where response component 92 represents the effect on movement of VCM actuator 45 caused by the portion of drive signal $S_{DR}$ from time 0 to time $t_1$ of FIG. 11 and response component 94 represents the effect on movement of VCM actuator 45 caused by the portion of drive signal $S_{DR}$ beginning at time $t_2$.

Signal processor 230 shifts the resonant period of ringing suppression signal 94 by a factor that may range from 0.3 to 0.5, e.g., the resonant period of ringing suppression signal 94 may be about 0.3 times to about 0.45 times the resonant period of pulse response signal 92. Summer 242 adds ringing suppression signal 94 to pulse response signal 92 to generate a summed signal that is transmitted to next position circuit 244, which generates a position adjustment signal that is transmitted to output drive circuit 254. Output drive circuit 254 generates a drive signal suitable for adjusting the position of the mechanical system element such as, for example, a lens, and transmits the drive signal to drive circuit 12, 12A, or 12B. Thus, ringing suppression signal 94 is generated to cancel or substantially cancel the ringing present in pulse response signal 92 and result in VCM actuator 45 quickly settling to its new position with suppressed ringing as shown by signal or trace 96.

Figure 13:
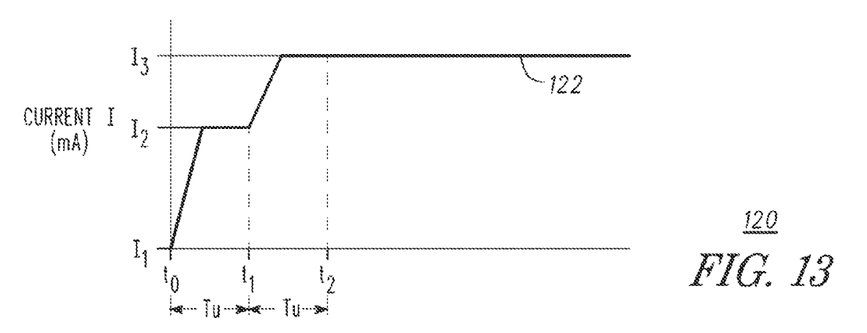
FIG. 13 is a pulse waveform generated in accordance with another embodiment of the present invention.
Figure 14:
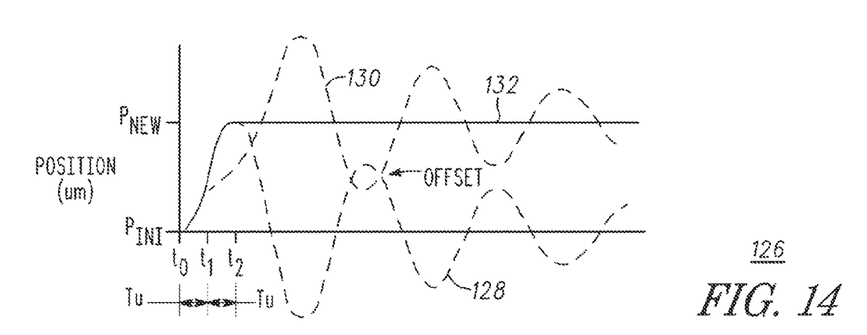
FIG. 14 is an embodiment of ringing suppression waveform in accordance with another embodiment of the present invention.

FIG. 13 is a drive signal plot 120 showing a trace 122 of drive signal $S_{DR}$ versus time and FIG. 14 is a plot 126 illustrating VCM actuator 45 position in response to drive signal $S_{DR}$ versus time. The ringing amplitude ratio (RAR) and the period T can be determined as described with reference to FIGS. 7 and 8 or as described with reference to FIGS. 9 and 10. In FIG. 8, waveform 83 has a period that is the time between time $t_0$ and time $t_2$. Thus, a half of the period T of trace 83, identified as half period Tu, may be described as the portion of trace 83 between times $t_0$ and $t_1$ or between times $t_1$ and $t_2$ as expressed by Equation 5 (Eqt. 5) as $$Tu = T/2 = (t_1 - t_0) = (t_2 - t_1) \qquad \text{Eqt. 5.}$$

Alternatively, in FIG. 10 waveform 87 has a period that is the time between time $t_2$ and time $t_4$. Thus, a half of the period T of trace 87, identified as half period Tu, may be described as the portion of trace 87 between times $t_2$ and $t_3$ or between times $t_3$ and $t_4$ as expressed by Equation 6 (Eqt. 6) as:

$$Tu = T/2 = (t_1 - t_0) = (t_2 - t_1) \qquad \text{Eqt. 6.}$$

The current waveform that produces trace 122 may be determined using Equation 7 (Eqt. 7):

$$(I_2 - I_1) = (I_3 - I_1) * RAR \qquad \text{Eqt. 7.}$$

It should be noted that current $I_1$ is the current level the initial position, current $I_3$ is the current level at the desired position, which are known values. Thus, the current level of current $I_2$ can be determined from equation 6.

Referring again to FIG. 13, drive signal $S_{DR}$ is a multi-stepped waveform that increases from current level $I_1$ to a current level $I_2$ at time $t_0$ and increases from current level $I_2$ to current level $I_3$ at time $t_1$. Between times $t_0$ and $t_1$, drive signal $S_{DR}$ transitions to and levels off at current level $I_2$ and between times $t_1$ and time $t_2$ drive signal $S_{DR}$ transitions to and levels off at current level $I_3$. FIG. 14 is a plot 126 of the position of VCM actuator 45 versus time in response to drive signal $S_{DR}$. VCM actuator 45 moves to new position $P_{NEW}$, then back to initial position $P_{INI}$ in a damped oscillatory fashion as indicated by trace 128 and oscillates about initial position $P_{INI}$ in response to drive signal $S_{DR}$ transitioning from current level $I_1$ to current level $I_2$ at time $t_0$ and leveling out at current level $I_2$. Trace 130 is generated in response to drive signal $S_{DR}$ transitioning from current level $I_2$ to current level $I_3$ at time $t_2$ and leveling out at current level $I_3$. More particularly, VCM actuator 45 moves to a position past position $P_{NEW}$ in response to drive signal $S_{DR}$ transitioning from current level $I_2$ to current level $I_3$ at time $t_1$ and leveling out at current level $I_3$. Then VCM actuator 45 oscillates about new position $P_{NEW}$ in a damped oscillatory fashion as shown by trace 130. Because drive signal $S_{DR}$ increases at time $t_0$, levels out at current level $I_2$ between times $t_0$ and $t_1$, increases from current level $I_2$ at $t_1$, and levels off at current level $I_3$ between times $t_1$ and $t_2$, the positional responses shown by traces 128 and 130 are superimposed on each other and result in VCM actuator 45 quickly settling at new position $P_{NEW}$ as shown by trace 132.

By now it should be appreciated that a control circuit suitable for use in mechanical system elements such as, for example a lens of camera system and a method for adjusting a position of the mechanical system element have been provided. The control circuit and method use the ringing amplitude and the resonant frequency to adjust the position of the mechanical system element.

Although specific embodiments have been disclosed herein, it is not intended that the invention be limited to the disclosed embodiments. Those skilled in the art will recognize that modifications and variations can be made without departing from the spirit of the invention. It is intended that the invention encompass all such modifications and variations as fall within the scope of the appended claims.

What is claimed is:

1. A method for controlling an actuator, comprising:
   providing a drive circuit having an input and a first input/output terminal and an actuator coupled to the first input/output terminal;
   causing the actuator to move in response to a first drive signal generated by a signal generator coupled to the input of the drive circuit;
   determining a resonant frequency and a ringing amplitude from a movement of the actuator using a ringing characteristic determination circuit, wherein the ringing characteristic determination circuit has an input coupled to the first input/output terminal of the drive circuit and to the actuator;
   generating a second drive signal from the signal generator in response to resonant period data and ringing amplitude data received from the ringing characteristic determination circuit and in response to actuator position data, wherein the actuator position data is derived by summing or subtracting a new position of the actuator generated by a first position indicator to or from a previous position of the actuator generated by a second position indicator; and
causing the actuator to move in response to the second drive signal.

2. The method of claim 1, wherein determining the resonant frequency and the ringing amplitude includes determining the resonant frequency and the ringing amplitude from the movement of a voice coil motor actuator.

3. The method of claim 2, wherein causing the actuator to move in response to the first drive signal includes causing the actuator to move in response to a first current signal.

4. The method of claim 1, wherein causing the actuator to move in response to the first drive signal includes causing the actuator to have an oscillatory movement having a waveform shape that has a plurality of amplitude values, and wherein a first amplitude value of the oscillatory movement is different from a second amplitude value of the oscillatory movement, which second amplitude value is different from a third amplitude value, and wherein the oscillatory movement has a period.

5. The method of claim 4, further including using the first amplitude value, the second amplitude value, and the third amplitude value to determine an amplitude ratio of the oscillatory movement.

6. The method of claim 5, wherein using the first amplitude value, the second amplitude value, and the third amplitude value to determine the amplitude ratio includes dividing a difference between the second amplitude value and the first amplitude value by a sum of the difference between the second amplitude value and the first amplitude value and a difference between the third amplitude value and the second amplitude value.

7. The method of claim 6, further including using the amplitude ratio and the period of the oscillatory movement to generate the second drive signal.

8. The method of claim 7, wherein a time interval between the first time and the second time can be represented by a product of the period of the oscillatory movement and a quantity that can be represented by a sum of the amplitude ratio divided by three and the difference between the amplitude ratio and 0.55 divided by 2 and a time interval between the second time and the third time that can be represented by a product of the period of the oscillatory movement and a quantity that can be represented by a sum of 1 divided by 3 and the difference between the amplitude ratio and 0.55 divided by 2.

9. The method of claim 8, wherein a portion of the second drive signal from the first time to the second time causes the actuator to oscillate about a first position that is different from a second position and wherein a portion of the second drive signal from third time causes the actuator to oscillate about the second position.

10. The method of claim 7, wherein the second drive signal is a current drive signal that increases from a first level to a second level at a first time and decreases to the first level at a second time, and wherein the current signal increases to the second level at a third time.

11. The method of claim 1, wherein causing the actuator to move in response to the first drive signal includes causing the actuator to move in response to a first current signal having a step shape that changes from a first current level to a second current level at a first time.

12. The method of claim 1, wherein causing the actuator to move in response to the first drive signal includes causing the actuator to move in response to a first current signal having a step shape that changes from a first current level to a second current level at a first time and from the second level to a third level at a second time, the second level greater than the first level.

13. A method for controlling a voice coil motor actuator, comprising:
providing a drive circuit, a ringing characteristic determination circuit, and a signal generator, wherein the drive circuit has an input and a first input/output terminal, the first input/output terminal coupled to the voice coil motor actuator, the ringing characteristic determination circuit has an input coupled to the first input/output terminal of the drive circuit and to the voice coil motor actuator and an output coupled to an input of the signal generator, and the signal generator has an output coupled to the input of the drive circuit in response to resonant period data and ringing amplitude data received from the resonant frequency and the ringing amplitude of the movement of the actuator characteristic determination circuit and in response to actuator position data, wherein the actuator position data is derived by summing or subtracting a new position of the actuator generated by a first position indicator to or from a previous position of the actuator generated by a second position indicator;
determining a resonant frequency and a ringing amplitude of an actuator movement in response to a first drive signal from the signal generator;
generating a second drive signal from the signal generator in response to the resonant frequency and the ringing amplitude of the actuator movement; and
moving the voice coil motor actuator in response to the second drive signal.

14. The method of claim 13, wherein moving the voice coil motor actuator in response to the second drive signal includes moving one of a uni-directional actuator or a bi-directional actuator.

15. The method of claim 13, wherein generating the adjusted control signal includes generating the adjust control signal as a pulse having a period that ranges between 0.3 and 0.4 of a period of the actuator signal.

16. An actuator control circuit, comprising:
a driver circuit having a plurality of terminals;
a ringing characteristic determination circuit having an input and an output, the input of the ringing characteristic determination circuit coupled to a first terminal of the plurality of terminals of the driver circuit and configured to provide a resonant frequency and a ringing amplitude in response to a movement of an actuator; and
a signal generator having an input and an output and configured to generate at least a first drive signal and a second drive signal at its output, the input coupled to the output of the ringing characteristic determination circuit and the output coupled to a second terminal of the plurality of terminals of the driver circuit, wherein the second terminal is an input terminal, and wherein the signal generator is configured to generate at least a first drive signal and a second drive signal at the output of the signal generator, wherein the second drive signal is generated in response to resonant period data and ringing amplitude data received from the ringing characteristic determination circuit and in response to actuator position data, wherein the actuator position data is derived by summing or subtracting a new position of the actuator generated by a first position indicator to or from a previous position of the actuator generated by a second position indicator and wherein the second drive signal causes the driver circuit to move the actuator.

17. The actuator control circuit of claim 16, wherein the ringing characteristic determination circuit comprises:
   an amplifier having an input and an output;
   a converter circuit having an input and an output, the input of the converter circuit coupled to the output of the amplifier; and
   a measurement circuit configured to measure the resonant frequency and the ringing amplitude from the movement of the actuator.

18. The actuator control circuit of claim 17, wherein the signal generator comprises:
   a waveform generator having first and second inputs and an output;
   a first summer having a first summing input, a second summing input, and a summing output, the summing output coupled to the second input of the waveform generator;
   a signal processor having first and second inputs and an output, the first input of the signal processor coupled to the output of the waveform generator;
   a second summer having a first summing input, a second summing input, and a summing output, the first summing input of the second summer coupled to the output of the signal processor;
   a first position indicator having an input, a first output, and a second output, the input of the first position indicator coupled to the output of the signal processor;
   a second position indicator having an input and an output, the input coupled to the first output of the first position indicator and the output of the second position indicator coupled to the second input of the second summer; and
   a drive circuit having an input and an output, the input of the drive circuit coupled to the output of the first position detector, the drive circuit configured to generate a digital code signal.

19. The actuator control circuit of claim 16, wherein the ringing characteristic determination circuit comprises:
   an operational amplifier having an inverting input, a non-inverting input, and an output;
   a first resistor coupled between the non-inverting input and the output of the operational amplifier;
   a series connected pair of resistors coupled between the output of the driver circuit and the inverting input of the operational amplifier;
   a first variable resistor having first and second terminals, the first terminal coupled to the non-inverting input of the operational amplifier; and
   a digital-to-analog-converter coupled to the second terminal of the first variable resistor.

20. The actuator control circuit of claim 16, wherein the driver circuit comprises:
   a digital-to-analog converter having an input and an output, wherein the input of the digital-to-analog converter serves as the second terminal of the driver circuit;
   an amplifier having an inverting input, a noninverting input, and an output, the noninverting input coupled to the output of the digital-to-analog converter and the inverting input coupled to a sense resistor; and
   a transistor circuit having a control terminal, a first current carrying terminal, and a second current carrying terminal, the control terminal coupled to the output of the amplifier and the first current carrying terminal of the transistor coupled to the input of the ringing characteristic determination circuit.

\* \* \* \* \*